(12) United States Patent
Kouno

(10) Patent No.: US 8,640,752 B2
(45) Date of Patent: Feb. 4, 2014

(54) CELESTIAL BODY RUNNING VEHICLE WHEEL

(75) Inventor: Yoshihide Kouno, Kunitachi (JP)

(73) Assignee: Bridgestone Corporation, Tokyo (JP)

( * ) Notice: Subject to any disclaimer, the term of this patent is extended or adjusted under 35 U.S.C. 154(b) by 386 days.

(21) Appl. No.: 12/921,005

(22) PCT Filed: Mar. 9, 2009

(86) PCT No.: PCT/JP2009/054435
§ 371 (c)(1), (2), (4) Date: Oct. 19, 2010

(87) PCT Pub. No.: WO2009/110633
PCT Pub. Date: Sep. 11, 2009

(65) Prior Publication Data
US 2011/0025118 A1 Feb. 3, 2011

(30) Foreign Application Priority Data

Mar. 7, 2008 (JP) ................................. 2008-058437
Jun. 4, 2008 (JP) ................................. 2008-147279

(51) Int. Cl.
*B60B 9/04* (2006.01)
*B60B 9/06* (2006.01)
*B60C 7/18* (2006.01)

(52) U.S. Cl.
USPC ................. 152/252; 152/13; 152/39; 152/88; 152/246

(58) Field of Classification Search
CPC ............. B60B 9/02; B60B 9/04; B60B 9/26; B60B 9/28; B60C 7/18
USPC ........... 152/1, 5, 6, 11, 12, 13, 14, 15, 16, 37, 152/38, 39, 69, 80, 87, 88, 90, 97, 99, 100, 152/246, 247, 251, 252, 261, 185.1
See application file for complete search history.

(56) References Cited

U.S. PATENT DOCUMENTS 521,570 A * 6/1894 McMaster ....................... 152/80
(Continued)

FOREIGN PATENT DOCUMENTS

FR 353771 A 9/1905
(Continued)

OTHER PUBLICATIONS

International Search Report Dated May 26, 2009 (3 pages).
(Continued)

*Primary Examiner* — Kip T Kotter
(74) *Attorney, Agent, or Firm* — Sughrue Mion, PLLC

(57) ABSTRACT

A wheel for a celestial running vehicle which enables the celestial running vehicle to sufficiently exhibit its desired running performance by maintaining a sufficient ground contact length, as well as reducing the wheel maximum width and the number of the sliding portions. The celestial body vehicle wheel (1) is mounted on a celestial body running vehicle and includes, a hub body (2) rotatable about a rotation axis, a grounding member (3) arranged radially outside of the hub body (2) and rotatable about the rotation axis while contacting a celestial body surface, and a load bearing device (4) arranged between the hub body (2) and the grounding member (3) for bearing radial load, the load bearing device (4) including, a plurality of first support members (5) arranged circumferentially to extend radially outward from the hub body (2) and terminate short of the grounding member (3), a plurality of second bearing members (6) arranged circumferentially to extend radially inward from the grounding member (3) and terminate short of the hub body (2), and elastic members (7) for connecting the first support members (5) and the second support members (6) to each other, wherein, under the radial load, the elastic members (7) are elastically deformed, and the first support members (5) and the second support members (6) are relatively displaced in directions approaching each other.

8 Claims, 20 Drawing Sheets

(56) References Cited

U.S. PATENT DOCUMENTS

| | | | | |
|---|---|---|---|---|
| 807,536 A * | 12/1905 | Berens | | 152/100 |
| 816,666 A * | 4/1906 | Kimball | | 152/15 |
| 916,929 A * | 3/1909 | Hanson | | 152/90 |
| 943,563 A * | 12/1909 | Peck | | 152/2 |
| 964,351 A * | 7/1910 | Welsh et al. | | 152/15 |
| 969,266 A * | 9/1910 | Gaynor | | 152/100 |
| 1,120,543 A * | 12/1914 | Root | | 152/89 |
| 1,131,324 A | 3/1915 | Burson | | |
| 1,226,362 A * | 5/1917 | O'Connor | | 152/13 |
| 1,279,754 A * | 9/1918 | Peltier | | 152/15 |
| 1,314,643 A * | 9/1919 | Grossman | | 152/35 |
| 1,396,283 A * | 11/1921 | Perry | | 152/90 |
| 1,948,412 A * | 2/1934 | Bennett | | 152/6 |

FOREIGN PATENT DOCUMENTS

| | | | |
|---|---|---|---|
| GB | 11089 A | 0/1913 | |
| JP | 50-118401 A | 9/1975 | |
| JP | 51-18003 A | 2/1976 | |
| JP | 51-49082 B1 | 12/1976 | |
| JP | 53-45962 B | 12/1978 | |
| JP | 53-45962 B1 | 12/1978 | |
| JP | 8-2204 A | 1/1996 | |
| JP | 9-285308 A | 11/1997 | |
| JP | 10-100602 A | 4/1998 | |
| JP | 2007-534531 A | 11/2007 | |

OTHER PUBLICATIONS

Extended European Search Report issued in European Application No. 09717765.3 dated Feb. 14, 2012.

Japanese Office Action, dated Jan. 8, 2013, issued in corresponding Japanese Application No. 2008-058437.

Japanese Office Action issued in Japanese Application No. 2008-147279 dated Apr. 9, 2013.

* cited by examiner (a)

(b)

(a)

(b)

(a)

(b)

(a)

(b)

CELESTIAL BODY RUNNING VEHICLE WHEEL

TECHNICAL FIELD

The present invention relates to a wheel to be a celestial body running vehicle designed for running on a celestial body such as a planet or natural satellite, and more particularly to a wheel which enables the celestial running vehicle to sufficiently exhibit its desired running performance.

BACKGROUND ART

A wheel mounted on a vehicle designed for running in a different environment from the earth, such as a planet and or natural satellite, is disclosed in Patent Document 1. In the wheel disclosed in this patent document, an inner ring to be connected to the axis of the vehicle and an outer ring to be brought into contact with the celestial body surface are connected with each other by spokes, wherein the outer ring and the spokes are each a rigid body. Thus, the wheel becomes elastically deformed to a negligible extent under load (i.e. compression force in the radial direction) from the vehicle. In such a wheel, it is less likely to have an adverse impact on the running performance when the wheel is used on a celestial body having a gravity not smaller than that of the earth and also a relatively hard surface.

Patent Document 1: JP 08-002204 A

DISCLOSURE OF THE INVENTION

Problem to be Solved by the Invention

However, when the wheel is used on a celestial body that having a significantly small gravity compared to the earth and its surface formed with fine-grained sands, such as found on the surface of the moon, the ground contact length of the wheel may not be sufficiently secured due to a small elastic deformation of the wheel, with result that the ground contact pressure of the wheel is locally increased. Such a local increase of the ground contact pressure possibly leads to slip of the wheel, thereby causing the vehicle to become stuck in the sand. Particularly, the sand is penetrated by the wheel due to the maximization of the ground contact pressure at the stepping-in-edge of the wheel, whereby the wheel tends to submerge into the sands. This would be a fatal problem for the vehicle unless the vehicle has some positive means for getting out of its stuck state.

Meanwhile, if the width of the wheel is enlarged so that the wheel would not submerge into the sands, new problems may occur as to enhanced tendency that the components of the wheel would clash against stumbling obstacles (for instance, rocks) and would be broken and/or that the vehicle would be blocked with the obstacles.

On the other hand, one may think of using a crawler as the drive-train that can avoid the above-mentioned problems due to securing of a sufficient ground contact length even on a celestial body having a low gravity environment and a sand surface, without enlarging the width of the wheel. Such a crawler ensures a stable running from its characteristics, but brings still another problem because it has a number of sliding portions. That is to say, flying sands associated with the running of the vehicle certainly enter the sliding portion, thereby causing a premature damage of the sliding portion. Especially, under low gravity environment, since the flying sands waft for a long time, the sands more easily enter the sliding portion. Out of concern for such damage, there is not much record of applying the crawler to the celestial running vehicle.

The task of the present invention is to solve the above-mentioned problems. An object of the present invention is to provide a wheel for the celestial running vehicle, which enables the celestial running vehicle to sufficiently exhibit its desired running performance by maintaining a sufficient ground contact length, as well as to reduce the wheel maximum width and the number of the sliding portions. Another object of the present invention is to secure a sufficient traction and prevent the wheel from slipping and submerging into the sands.

Means for Solving the Problem

To achieve these objects, the present invention provides a celestial body vehicle wheel mounted on a celestial body running vehicle designed for running on a celestial body comprising, a hub body rotatable about a rotation axis, a grounding member arranged radially outside of the hub body and rotatable about the rotation axis while contacting a celestial body surface, and a load bearing means arranged between the hub body and the grounding member for bearing radial load, the load bearing means including, a plurality of first support members arranged circumferentially to extend radially outward from the hub body and terminate short of the grounding member, a plurality of second bearing members arranged circumferentially to extend radially inward from the grounding member and terminate short of the hub body, and elastic members for connecting the first support members and the second support members to each other, wherein, under the radial load, the elastic members are elastically deformed, and the first support members and the second support members are relatively displaced in directions approaching each other. It is noted that the term "celestial body" includes natural satellite, planet, asteroid and comet. The term "radial direction" means a radial direction of wheel. The term "circumferential direction" means a circumferential direction of wheel. Here, the "hub body" may be connected to the shaft of the vehicle either directly or indirectly via another member such as a disk or spokes.

According to the celestial body running vehicle wheel, when the wheel contacts the ground G, the elastic member coupling the first support member and second support member in a ground contact region are elastically deformed and the first support members and second support members relatively displace sufficiently in directions approaching each other. As a result, the grounding member in the ground contact region is deformed to correspond to the profile of the ground, the ground contact length of the grounding member are enlarged, then the ground contact pressure is reduced.

Therefore, when the wheel is used on the celestial body having low gravity environment and the sand surface, the wheel is elastically deformed significantly and sufficient ground contact length can be secured. That is, since the ground contact pressure of the wheel can be reduced, the wheel has no chance of slipping as well as submerging into the sands. Therefore, the vehicle can sufficiently exhibit its desired running performance. Also, the wheel of the present invention has no sliding portion and no chance of incursion of the sand or dust, whereby the possibility of a damage or failure of the wheel is low. In addition, since the second support members are displaced only in the radial direction not in the width direction, the maximum width of the wheel is small during running. As a result, the clash of the load bearing means against stumbling obstacles is prevented during running.

As stated above, the celestial body vehicle wheel of the present invention can be effectively used on especially the celestial body having the low gravity environment and the sand surface.

In the celestial body vehicle wheel, it is preferred that the load bearing means is located inside of ends of the grounding member in a width direction thereof. Here, the term "width direction" means a width direction of the wheel.

In the celestial body vehicle wheel, it is preferred that the wheel further comprises biasing means for biasing the circumferentially adjacent second support members and separating each other in a circumferential direction. In this case, it is preferred that each of the biasing means is a U-shaped plate spring.

In the celestial body vehicle wheel, it is preferred that the grounding member is an endless belt. In this case, it is preferred that the endless belt is provided with tension imparting means for imparting a tensile force in a circumferential direction to the endless belt.

In the celestial body vehicle wheel, the grounding member has stepped portions extending in the width direction on a surface to be brought into contact with the celestial body surface.

In the celestial body vehicle wheel, the grounding member has metal fibers on a surface to be brought into contact with the celestial body surface.

To achieve another object, the present invention provides a grounding member for wheel to be mounted on the celestial body vehicle designed for running on a celestial body surface comprising a porous member disposed at a portion to be brought into contact with the celestial body surface, and support member for supporting the porous member. Here, the term "porous member" indicates a member internally having a myriad of micro holes.

When the grounding member is applied to the wheel mounted on the celestial body vehicle, the grounding member including the porous member is deformed to correspond to the surface profile of the ground covered with the sands etc, whereby the ground contact pressure is made more uniform and reduced, the sands are not collapsed or penetrated, and the desired traction performance is secured.

According to the grounding member of the present invention, it is possible to secure the sufficient fraction performance as well as prevent the wheel from slipping and submerging into the sands. In addition, according to the grounding member of the present invention, the structure is simple and its weight is light.

As stated above, since the grounding member of the present invention can be effectively used on the celestial body surface especially coated with fine-grained sands causing high liquidity, it can be suitable for use in a wheel of a lunar rover.

It is preferred that the support member is in the form of plate and the grounding member is formed by layering the porous member on the plate-shaped support member.

It is preferred that the plate shaped support member has projections which are formed on the surface that the porous member to be layered, and project from the porous member under the load during grounding.

It is preferred that the porous member is formed by three-dimensionally entangling the fibers together, wherein the fiber has prominences on its surface.

It is preferred that a void ratio of the porous member is within a range of 0.1%-50%.

It is preferred that a thickness of the porous member is within a range of 0.1 mm-10 mm.

Effect of the Invention

According to the present invention, a celestial running vehicle wheel enables the celestial running vehicle to sufficiently exhibit its desired running performance by maintaining sufficient ground contact length, as well as to reduce a wheel maximum width and sliding portions. According to the grounding member of the present invention, it is possible to secure sufficient traction and prevent the wheel from slipping and submerging into the sands.

BRIEF DESCRIPTION OF DRAWINGS

FIG. 1 is a schematic side view of a celestial body running vehicle wheel before mounting to the vehicle in accordance with the first embodiment of the present invention, wherein;

FIG. 16 (b) is a partial cross sectional view showing the wheel of FIG. 16 (a) in a grounding state;

FIG. 18 (b) is a partial cross sectional view showing the wheel of FIG. 18 (a) in a grounding state;

FIG. 19 (b) is a side view of the wheel of FIG. 17 in a grounding state;

Figure 1:
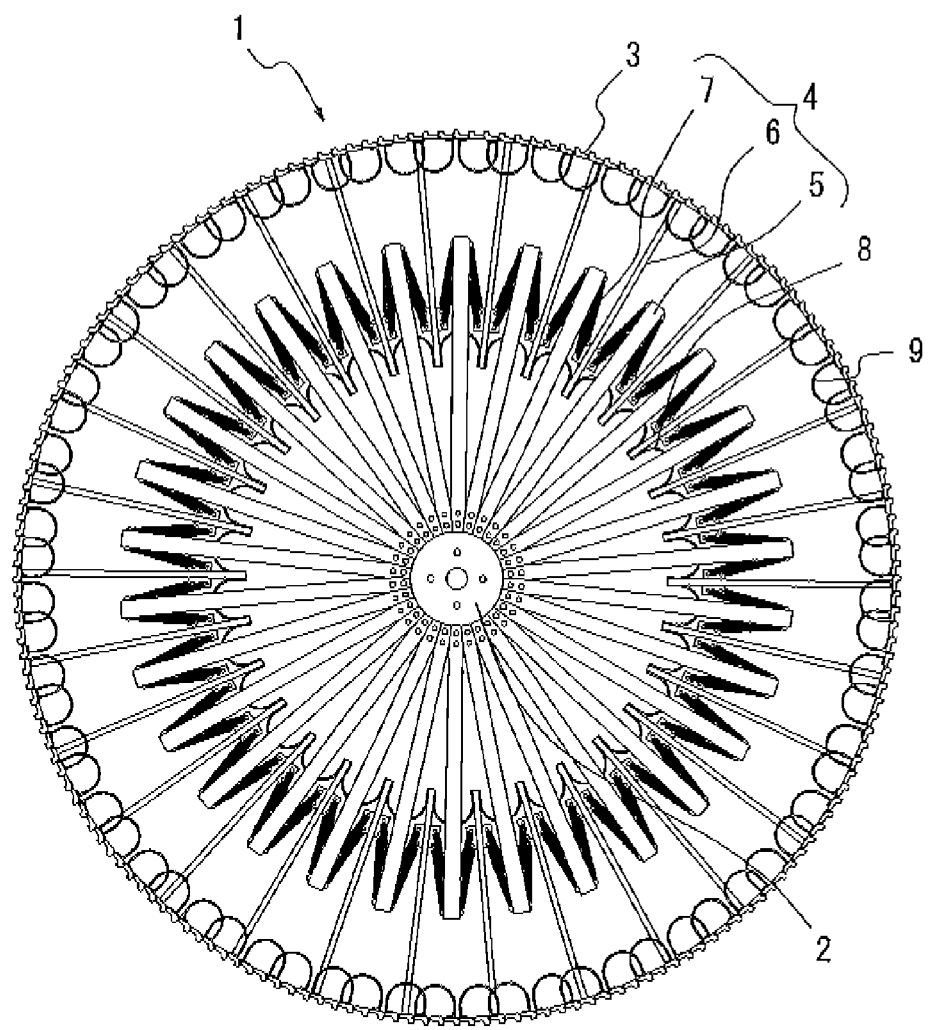

REFERENCE SYMBOLS 1, 21, 41, 51 Wheel
2 Hub body
3 Grounding member
3c Stepped portion
4, 22, 42 Load bearing means
5, 23 First support member
6, 24 Second support member
7, 25 Coil spring
8, 9, 9a, 9b, 43 Horseshoe-shaped plate spring
100 Grounding member
101 Porous member

DESCRIPTION OF EMBODIMENTS

Figure 2:
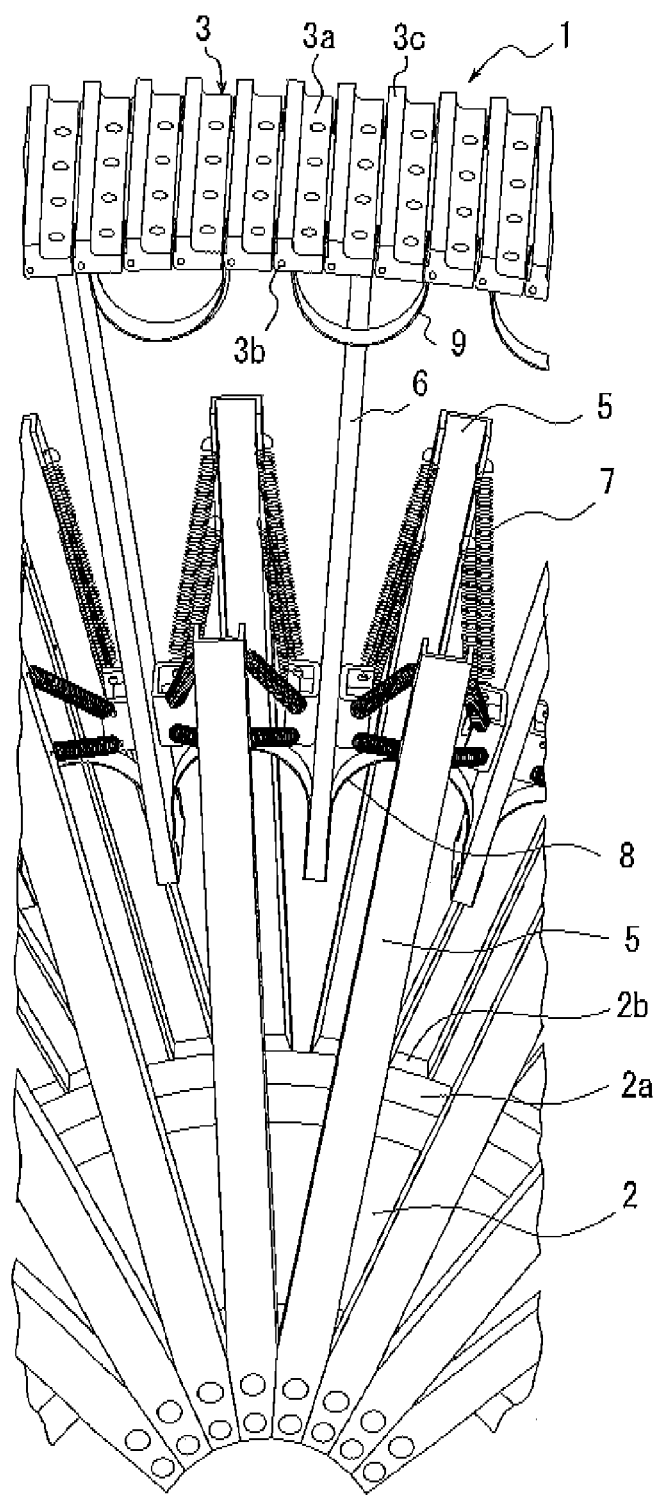
FIG. 2 is a schematic perspective view showing a part of the celestial body running vehicle wheel of FIG. 1 with enlarging.
Figure 3:
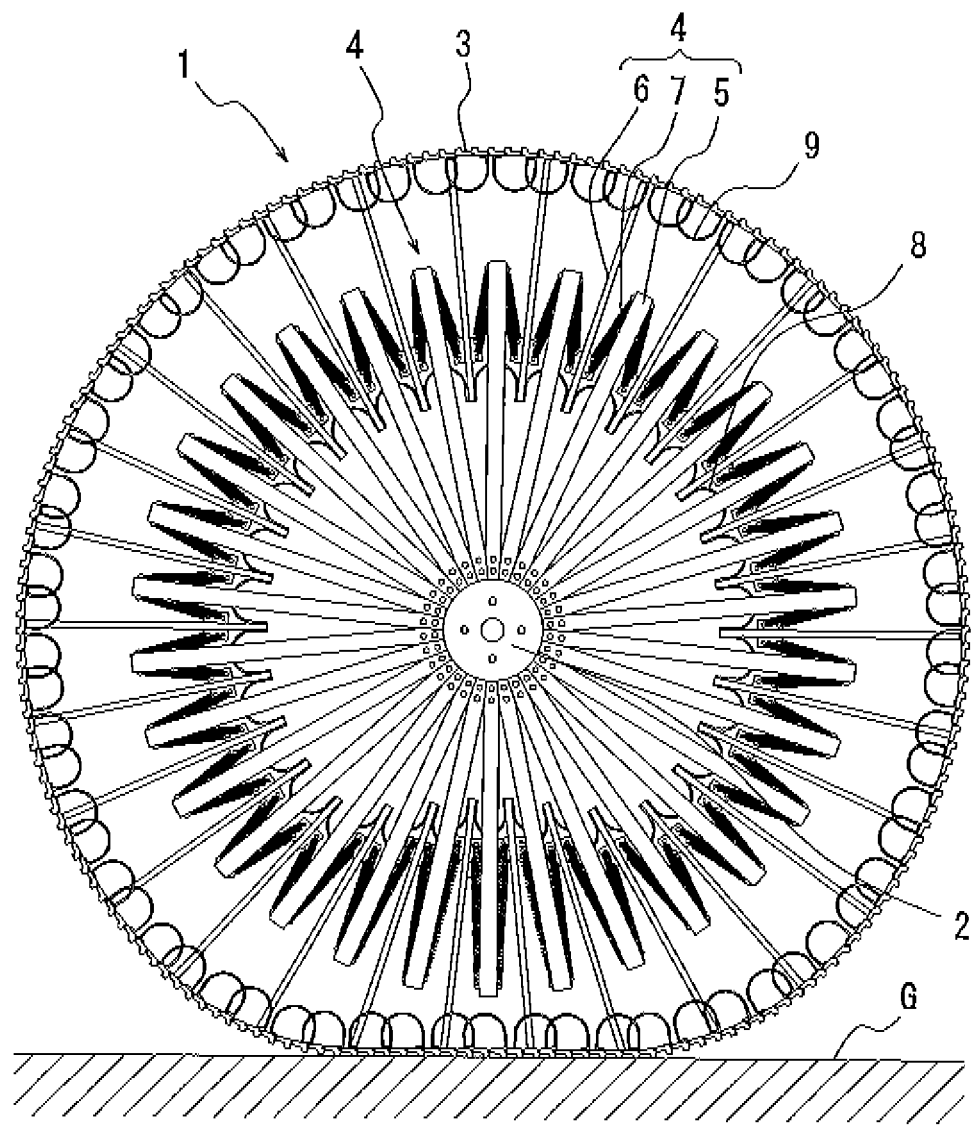
FIG. 3 is a schematic side view showing the celestial body running vehicle wheel of FIG. 1 in a grounding state.
Figure 4:
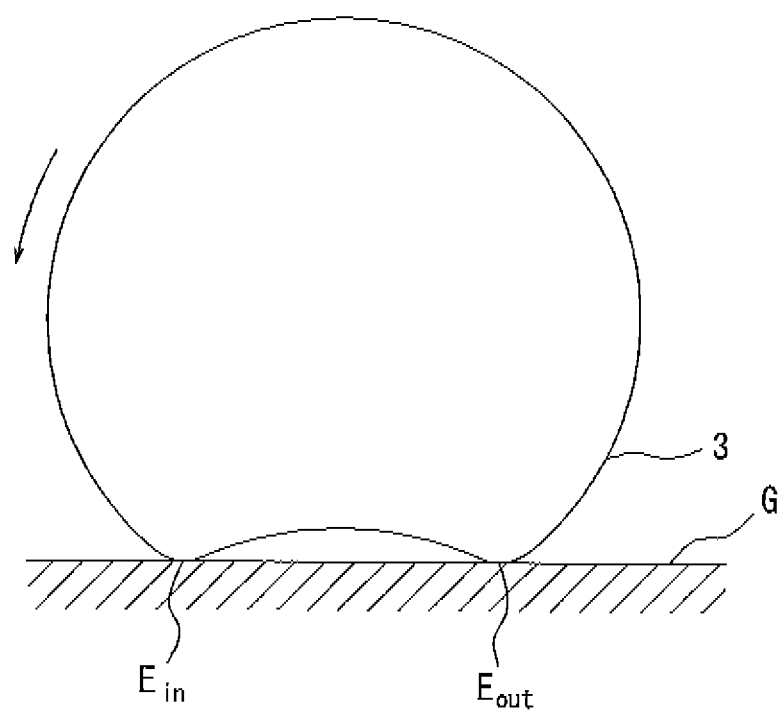
FIG. 4 is a outline view showing a buckling of a grounding member.

Hereinafter, embodiments of the present invention are described in more detail with referring to the accompanying drawings. FIG. 1 is a schematic side view of a celestial body running vehicle wheel (hereinafter referred to as "wheel") before mounting to the vehicle in accordance with the first embodiment of the present invention. FIG. 2 is a schematic perspective view showing a part of the celestial body running vehicle wheel of FIG. 1 with enlarging. FIG. 3 is a schematic side view showing the celestial body running vehicle wheel of FIG. 1 in a grounding state. FIG. 4 is a outline view showing a buckling of a grounding member.

As shown in FIG. 1, wheel 1 comprises hub body 2 to be connected with the shaft (not shown) of the vehicle and rotatable about the rotation axis of the shaft, and grounding member 3 arranged radially outside of the hub body 2. The grounding member 3 is rotatable together with the hub body 2 about the rotation axis and to be brought into contact (ground) with the celestial body surface during the vehicle running. The hub body 2 and grounding member 3 are coupled by load bearing means 4. The load bearing means 4 bears the load (radial road) of the vehicle against the ground, when the wheel 1 contacts the ground.

The hub body 2, as shown FIG. 2, is formed into annular shape and its rotation center portion is to be connected with the shaft (not shown) of the vehicle. The grounding member 3 is an endless belt such as used for a caterpillar tread and continuously extends in a wheel circumferential direction. In this embodiment, such an endless belt shape of the grounding member 3 is formed by combining a plurality of plate-like small piece 3a with connecting pins 3b, but it can be formed by a continuing thin sheet (for instance, a metal band) as described later. It is preferable to provide stepped portions (engage portions) 3c extending in a wheel width direction on the outer circumferential surface of the ground member 3 in order to prevent slip against the ground during running. From the same reason, it is preferable to provide metal fibers on this outer circumferential surface.

A pair of flange portions 2a extending radially outward are formed at the both width ends of the hub body 2. First support members 5 are respectively provided on each flange portion 2a. Each first support member 5 extends radially outward from the flange portion 2a and terminates short of the ground member 3. The plurality of the first support members 5 are arranged at specified intervals in the wheel circumferential direction. In this embodiment, each first support member 5 is formed into channel-like plate to increase stiffness. Screws can be used for coupling the first support members 5 and the hub body 2 with each other, but it is not limited to this, the first support member 5 and the hub body can be coupled with each other by mean of engagement, fitting and adhesion. In addition, in this embodiment, in order to increase the strength of a portion where the first support member 5 and the hub body 2 are connected, a rigid reinforcing member 2b formed into a rectangular-parallelepiped-shape is inserted between the first support member 5 and the hub body 2.

On the other hand, second support members 6 are provided on the inner circumference surface of the grounding member 3. Each second support member 6 extends radially outward from the inner circumference surface of the grounding member 3 and terminates short of the hub body 2. The plurality of the second support member 6 are arranged in the wheel circumferential direction and positioned between the circumferentially adjacent first support members 5. In this embodiment, each second support member is formed by flat plate. The second support members 6 are fixed to the grounding member 3 in a known manner as well as the first support member 5.

A plurality of coil springs 7 as elastic members link the vicinities of the radial outer ends of the circumferentially adjacent first support members 5 and the vicinity of the radial inner end of the second support member 6. Thereby, the first support members 5 and the second support members 6 are elastically coupled each other. In this embodiment, each second support member 6 is linked to two pair of (i.e., four) first support members 5 adjacent to this second support member 6 with eight coil springs. The number of the coil spring 7 can be modified depending on circumstances of use such as the weight of the vehicle. The first support member 5, the second support member 6 and the coil springs 7 as stated above constitute the load bearing means 4 as a whole arranged between the hub body 2 and the grounding member 3 for bearing the radial road of the vehicle.

Here, the working of the wheel 1 is described. As shown in FIG. 3, when the wheel 1 of the embodiment is mounted on the vehicle and contacts the ground G, the coil springs 7 in the ground contact region expand and the second support members 6 are displaced radially inward (toward the first support member 5). That means the first support members 5 and second support members 6 are relatively displaced sufficiently in directions approaching each other and along the radial direction. Thereby, the grounding member 3 in the ground contact region is deformed to correspond to the profile of ground G and the ground contact length of the grounding member 3 is enlarged resulting in that the ground contact pressure is reduced. Thus, even though the wheel 1 is used on the celestial body having low gravity environment and sand surface, the wheel 1 is elastically deformed significantly and sufficient ground contact length can be secured. That is, since the ground contact pressure of the wheel 1 can be reduced, the wheel 1 would not slip or submerge into the sands. Therefore, the vehicle can sufficiently exhibit its desired running performance. Also, since the wheel 1 according to the present invention has no sliding portion that the sands or dusts to be entered, the possibility of the damage or failure of the wheel is low. In addition, since the second support members 6 are displaced only in the radial direction not in width direction, the maximum width of the wheel 1 is reduced. As a result, clash of the load bearing means 4 against stumbling obstacles is prevented during running.

In the present invention, it is preferred that the load bearing means 4 is located inside the width ends of the grounding member 3. According to this configuration, the clash of the load bearing means 4 against the stumbling obstacles can be surely prevented.

In the present invention, as shown in FIGS. 1-3, it is preferable to provide U-shaped plate springs 8 for coupling the circumferentially adjacent second support members 6 and biasing the second support members 6 in directions circumferentially away from each other. According to this configuration, the shape of the wheel 1 can be surely maintained. And it is prevented from contact among the second support means 6 due to excessive closeness of their selves during running under load. The U-shaped plate spring constitutes biasing means for biasing the circumferentially adjacent second support means 6 and separating with each other in the circumferential direction.

In addition, in the present invention, it is preferable to provide a plurality of U-shaped plate spring 9 for imparting a tensile force in the wheel circumferential direction to the grounding member 3 formed into endless-belt shape. Each plate spring 9 is arranged on the inner circumference surface of the grounding member 3 wherein the opening side of the plate spring 9 faces to the inner circumference surface of the grounding member 3 while the convex side of the plate spring 9 faces to the hub body 2. According to this configuration, the circumferential tensile force is imparted to the grounding member 3, thereby buckling (buckling phenomenon) of the grounding member 3 in the ground contact region can be avoided. As a result, slip of the grounding member 3 against the ground G can be further prevented and it can be possible to improve the running stability of the vehicle. This is effective for wheel 1 in climbing hill, in particular. Here, "buckling" is a phenomenon that only a stepping-in portion $E_{in}$, and a kicking-out portion $E_{out}$ of the grounding member 3 support the load during running while the middle portion between the stepping-in portion $E_{in}$, and kicking-out portion $E_{out}$ is dented and uplifted from the ground G, as shown in outline of wheel side of FIG. 4. A plurality of the U-shaped plate springs 9 constitute tension imparting means for imparting the circumferential tensile force to the endless belt (the grounding member 3). It is noted that coil springs, thin flat plates or flexible I-section member can be used as the tension imparting means, other than the U-shaped plate springs 9.

Figure 5:
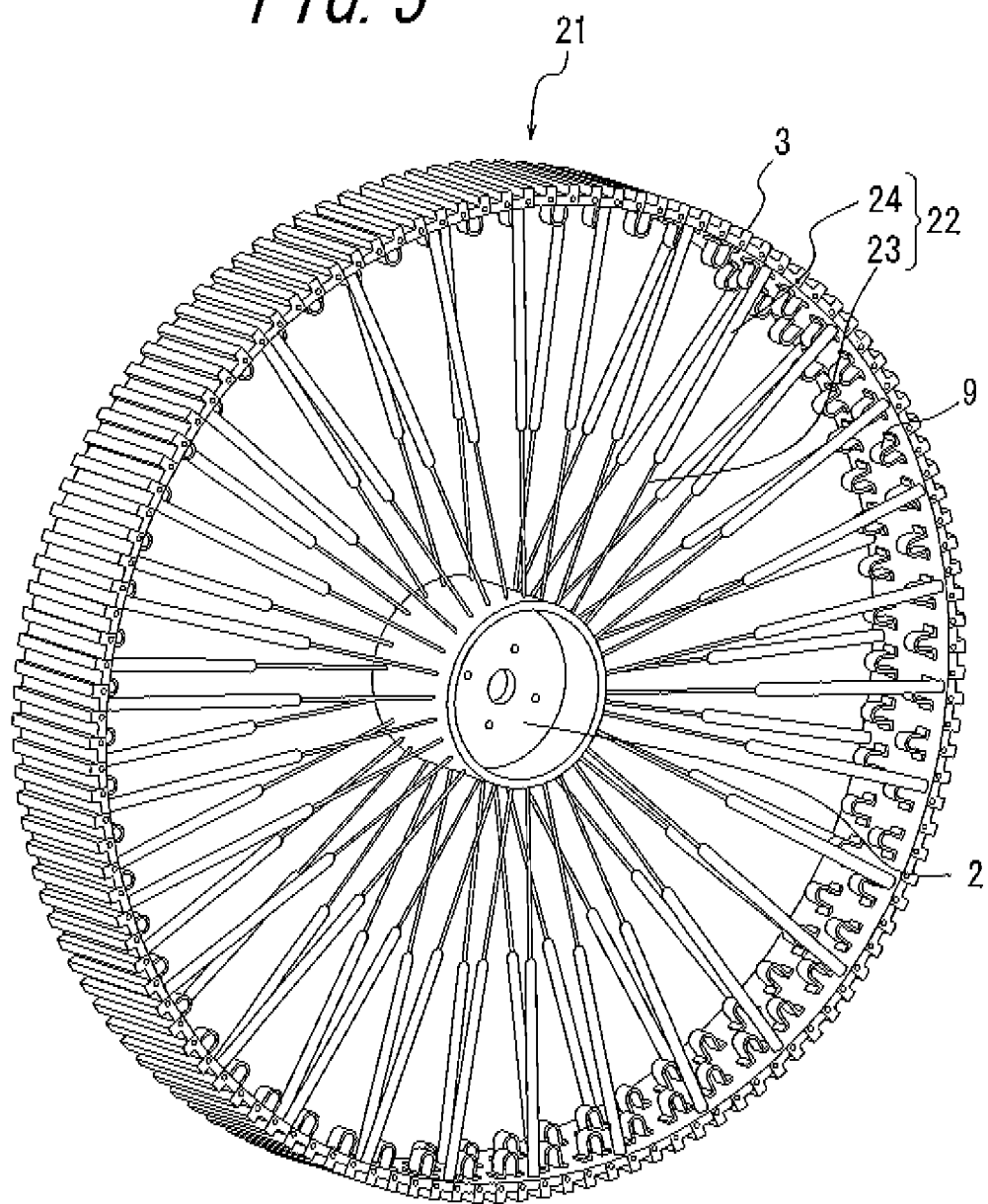
FIG. 5 is a perspective view showing a celestial body running vehicle wheel in accordance with another embodiment of the present invention.
Figure 6:
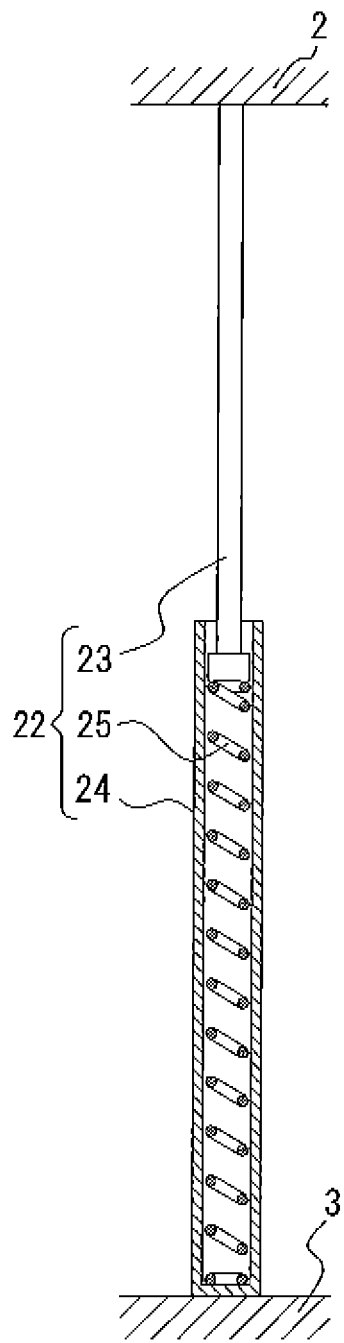
FIG. 6 is a partial cross sectional view of a load bearing means of the celestial body running vehicle wheel of FIG. 5 along a radial direction.
Figure 6:
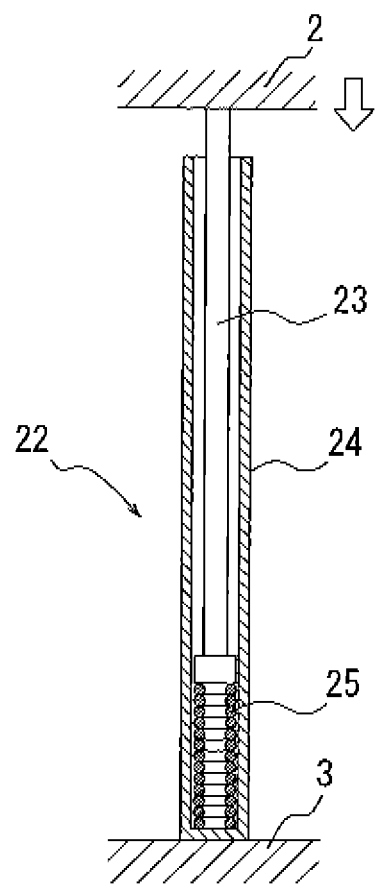

Hereinafter, another embodiment of the present invention will be described with referent to the drawings. FIG. 5 is a perspective view of a wheel of another embodiment of the present invention. FIG. 6 is a sectional view of the wheel shown in FIG. 5 along a radial direction. It is noted that like reference numerals are used to refer to similar components of the wheel in the above-mentioned embodiment and a redundant description is omitted.

As shown in FIG. 5, wheel 21 comprises hub body 2 rotatable about the rotation axis of the vehicle (not shown), grounding member 3 arranged radially outside of the hub body 2, to be brought into contact (ground) with the celestial body surface and rotatable about the rotation axis, and load bearing means 4 coupling the hub body 2 and grounding member 3. As shown in FIG. 6, rod-like first support members 23 are provided on both width ends of the hub body 2. Each first support member 23 is connected to the hub body 2 at a first end of the first member 23, extends radially outward from the first end and terminates short of the ground member 3. The first support members 5 are arranged at specified intervals in the wheel circumferential direction. Screws can be used for coupling the first support members 5 and the hub body 2, but it is not limited to this, the first support member 5 and the hub body can be coupled by mean of engagement, fitting and adhesion.

On the other hand, a plurality of cup-shaped second support members 24 each having opening are provided on the inner circumference surface of the grounding member 3. Each second support member 24 extends radially outward from the inner circumference surface of the grounding member 3 to the first support member 23 and terminates short of the hub body 2. A part of each the first support member 23 is inserted into the opening of the second support member 24. The second support members 24 can be fixed to the grounding member 3 in a known manner, in a similar way to the first support member 23.

It is provided with coil spring 25 inside each the second support member 24 and between a tip (a free end) of the first support member 23 and a bottom of the second support member 24 (or the inner circumference surface of the grounding member 3), thereby these first support member 23 and second support member 24 (or the inner circumference surface of the grounding member 3) are elastically connected. The second support member 24 also has the function of guiding the displacement of the first support member 23 along the radial direction. The elastic force of the coil spring 25 can be modified depending on circumstances of use such as the weight of the vehicle.

Here, the working of the wheel 21 is described. As shown in FIG. 6(b), when the wheel 21 of the embodiment is mounted on the vehicle and contacts the ground G, the coil springs 25 in the ground contact region elastically constrict, then the first support member 23 and the second support members 24 (or the grounding member 3) are displaced in an approaching direction and along the radial direction. As a result, the grounding member 3 in the ground contact region is significantly deformed to correspond to the profile of ground G, the ground contact length of the grounding member 3 are enlarged resulting in that the ground contact pressure is reduced.

Therefore, even though the wheel 21 is used on the celestial body having the low gravity environment and sand surface, the wheel 21 is elastically deformed significantly and sufficient ground contact length can be secured. That is, since the ground contact pressure of the wheel 21 can be reduced, the wheel would not slip or submerge into the sands. As a result, the vehicle can sufficiently exhibit its desired running performance. Also, since the wheel 21 has few sliding portion where the sands or dusts enter, the possibility of the damage or failure of the wheel is low. In addition, since the first support member 23 and the second support member 24 are displaced only in the radial direction not in width direction, the maximum width of the wheel 21 can be reduced even during running. As a result, clash of the load bearing means 4 against the stumbling obstacles is prevented during running.

It is noted that this wheel can be adapted to the environment of the celestial body (temperature, gravity, surface profile, etc.), vehicle specification, and application by modifying the dimension and material of the component of the wheel and elastic coefficient of the elastic members (U-shaped plate spring 8, 9 and coil spring 7, 25) etc.

Figure 7:
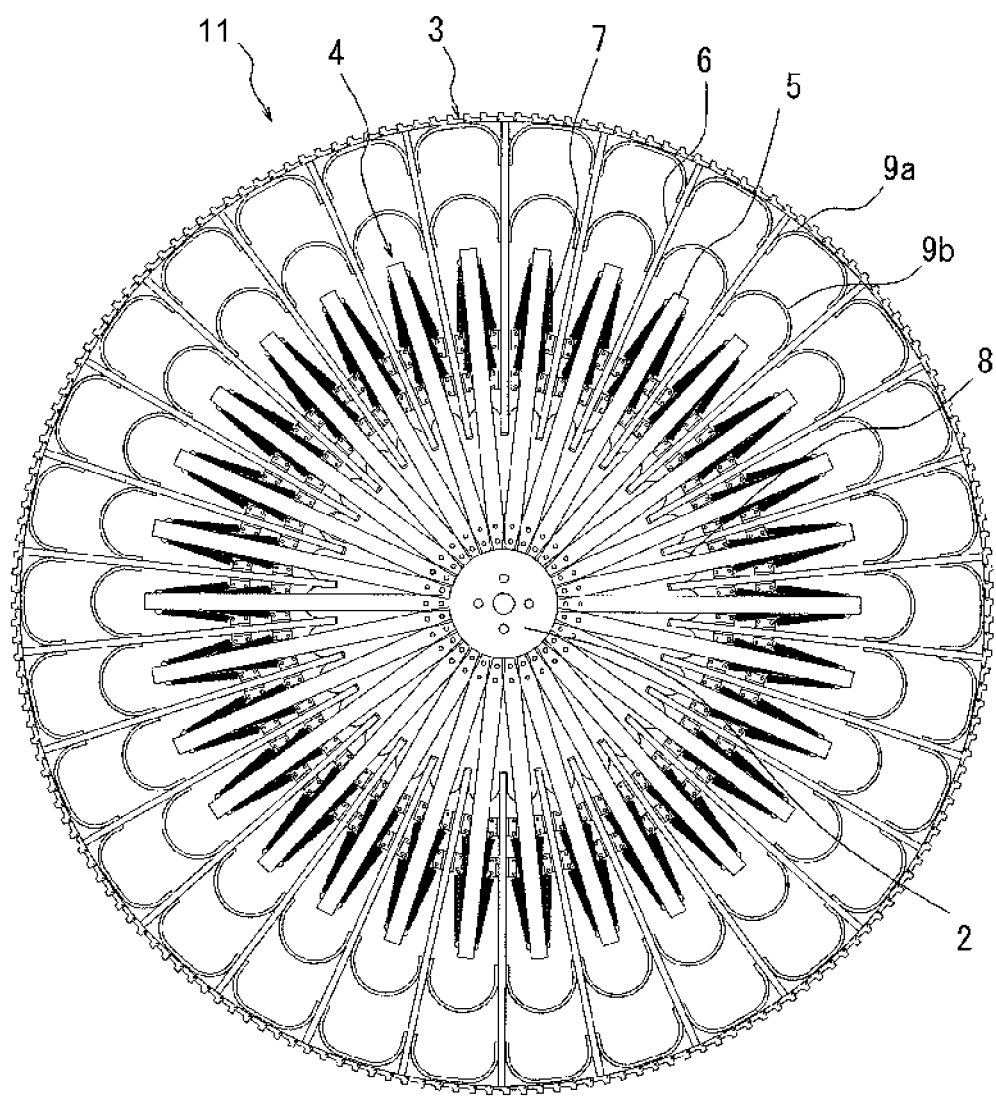
FIG. 7 is a schematic side view showing a celestial body running vehicle wheel in accordance with another embodiment of the present invention.

Above-mentioned embodiments are just a part of the present invention and may take on various modifications and alterations without departing from the spirit and scope of the disclosure. For example, the tension imparting means is not limited to the above embodiment as long as it can impart the circumferential tensile force to the grounding member, also its arrangement and quantity can be modified. More specifically, in a wheel of another embodiment shown in FIG. 7, arrangement and the number of the U-shaped plate spring as the tension imparting means differ from that of the wheel of FIG. 1. In the wheel 11 of FIG. 7, two U-shaped plate springs 9a, 9b as the tension imparting means are lined up along the radial direction between the circumferential adjacent second support members 6. Since the tension imparting means is constituted by arranging the multiple plate springs 9a, 9b in this way, the buckling can be further prevented. In addition, since the multiple plate springs 9a, 9b are provided between the adjacent second support members 6, an undesirable movement in the wheel width direction and twist of the second support member 6 can be inhibited, thereby, running stability also can be improved. From the view point of effectively inhibiting the movement in the wheel width direction and the twist, it is preferred that the U-shaped plate springs 9a, 9b are disposed more inward in the wheel radial direction. The number of the plate springs provided between adjacent second support members 6 can be more than three (not shown).

Hereinafter, a grounding member of the present that is applicable to the celestial body running vehicle will be described with background of the invention.

Figure 8:
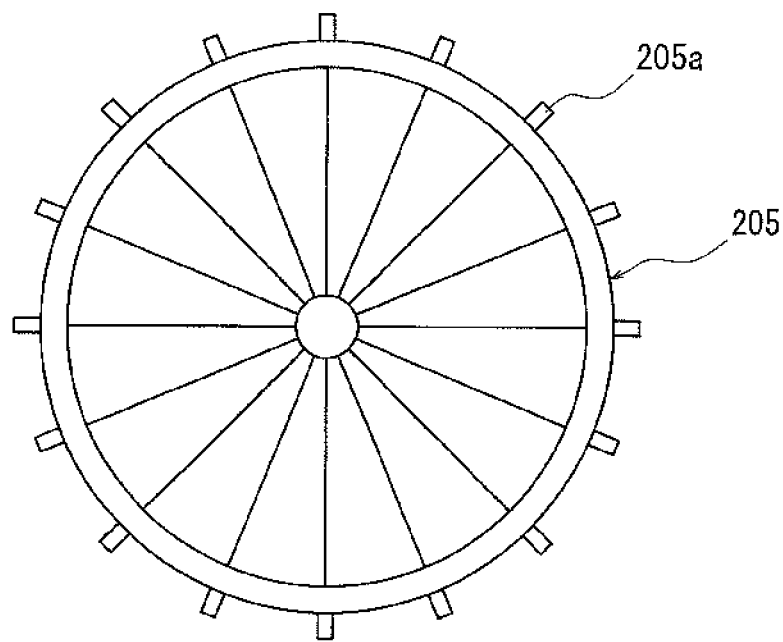
FIG. 8 is a schematic side view showing a celestial body running vehicle wheel of prior art.
Figure 9:
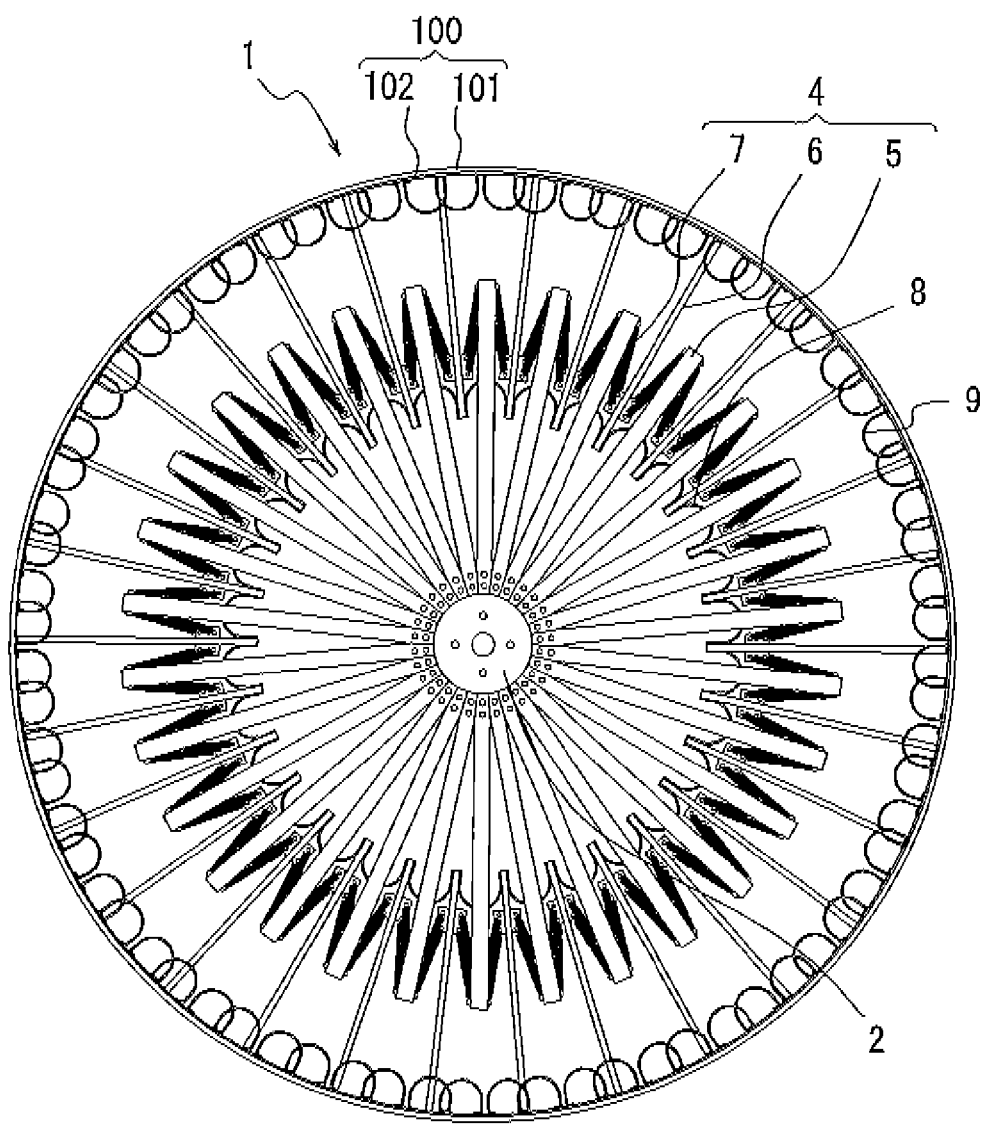
FIG. 9 is a side view showing a celestial body running vehicle wheel applied with a grounding member of the present invention.

As mentioned above, one wheel mounted on the vehicle designed for running in a different environment from the earth is disclosed in JP 08-002204 A. In the heel of disclosed in this patent document, it is provided with dust controlling members which are arranged on the outer ring of the wheel body at specified intervals in circumferential direction and impacted with elastic force in radially outward by elastic mechanisms. These dust controlling members improve the traction performance on the surface of the planets. The wheel of the lunar rover (Lunokhod) launched by Soviet Union, as shown in FIG. 8, is provided with spike-like projections 205a at specified intervals on the outer circumference portion (grounding member) 205 of the wheel to secure the fraction performance.

However, such the dust controlling members and the spile-like projections may interfere with the running, when the wheel is used on the celestial body whose surface is coated with fine-grained sands causing high liquidity. For instance, it have been reported that the Lunokhod confronted with great difficulty in running because the wheel slipped and submerged into the sands. This is because the spike-like projections act like a shovel and submerge the wheel into the sands like a doodlebug. Moreover, such problem becomes prominent during running on the slope causing a local load generated on the grounding member of the wheel. In the case of the celestial body running vehicle designed for unmanned running, this would be a fatal problem unless the vehicle has some positive means for getting out of its stuck state.

A grounding member of the present invention is made for solving the above-mentioned problem. An object of the present invention is to prevent the wheel from slipping and submerging into the sands as well as to secure sufficient fraction performance by modifying the grounding member of the wheel.

Figure 10:
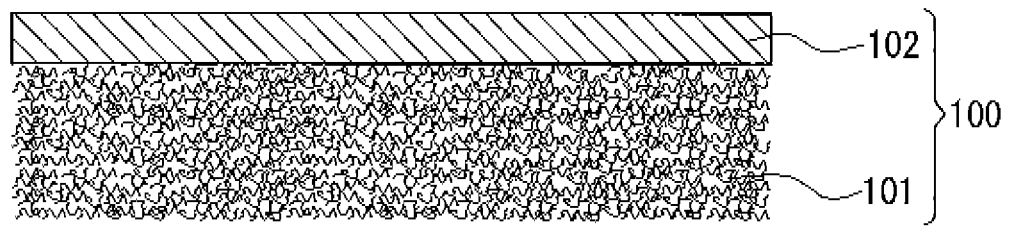
FIG. 10 is a cross sectional view showing the grounding member of FIG. 9 along a wheel width direction.
Figure 11:
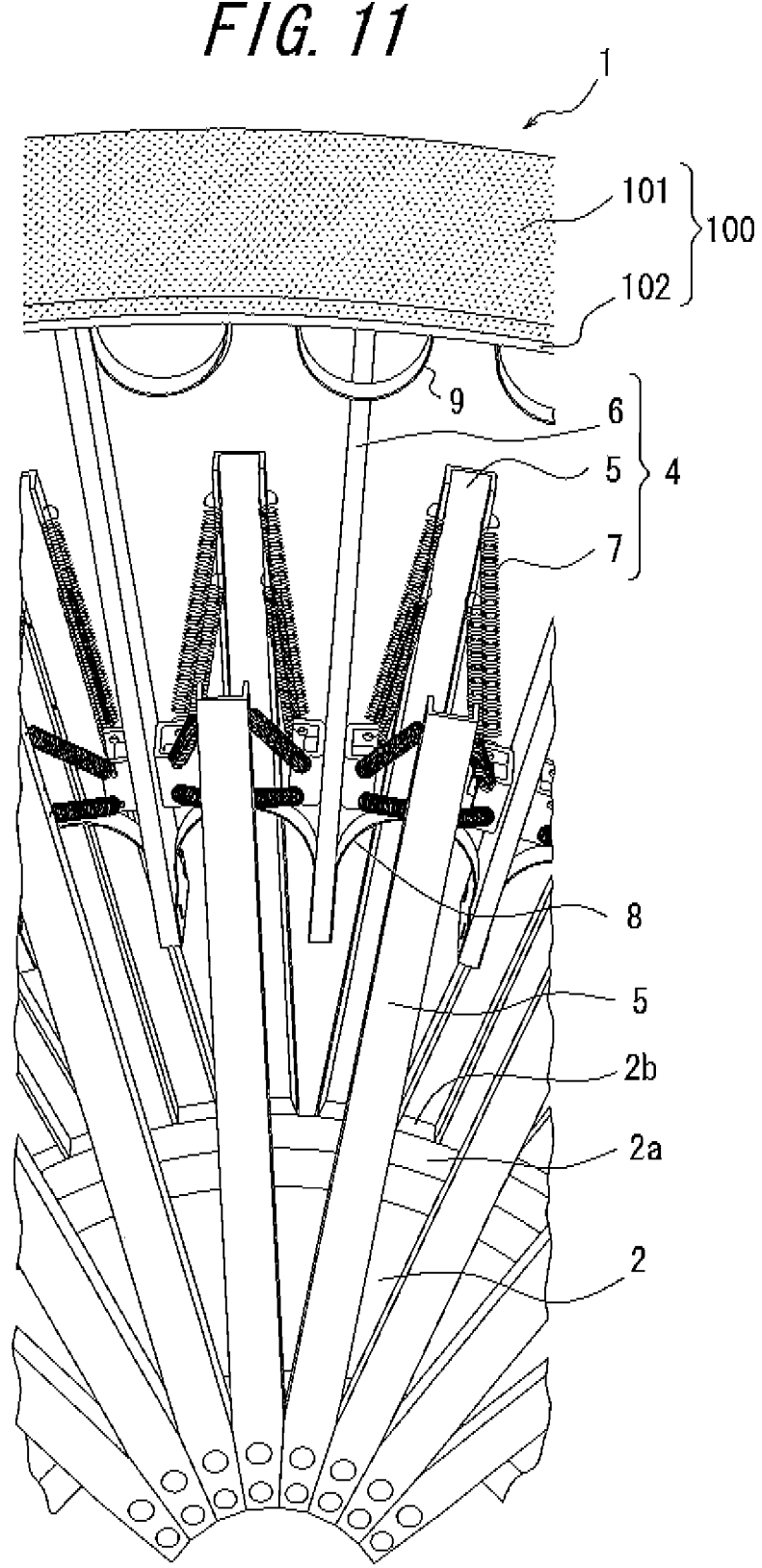
FIG. 11 is a partial perspective view of the wheel of FIG. 9.

Wheel 1 as shown in FIGS. 9-12 has essential structure same as that of the wheel 1 of FIG. 1, but only the constitution of the grounding member is different. Specifically, the grounding member 100 according to the present invention that is applicable to the wheel 1, as shown in FIG. 10, comprises a porous member 101 with predetermined thickness disposed at a portion to be brought into contact with the celestial body surface, and a support member 102 for supporting the porous member 101 from its inner surface side. The support member 102 is formed into thin plate and continuously extends in wheel circumferential direction. The inner surface of the support member 102 is connected and fixed to the second support member 6 of the wheel 1. The porous member 101 can be layered on the outer surface of the support member and joined with an adhesive, rivets and clips etc., but it is noted that the bending (elastic deformation) of the grounding member during running of the wheel should not be interfered by them. It can be applied for the porous member 101 with felt-like member that is created by mechanically or chemically processing the fibers and intricately entangling the fibers together, sponge-like member having porous structure, and nonwoven member that is formed by mechanically, thermally or chemically entangling staples or filaments together. It can be preferably used for the material of these members with metal, (e.g., see fibers 101a in FIG. 13), ceramic, glass or resin in view of thermal resistance and endurance, but not limited, it is selectable depending on circumstances of use.

Figure 12:
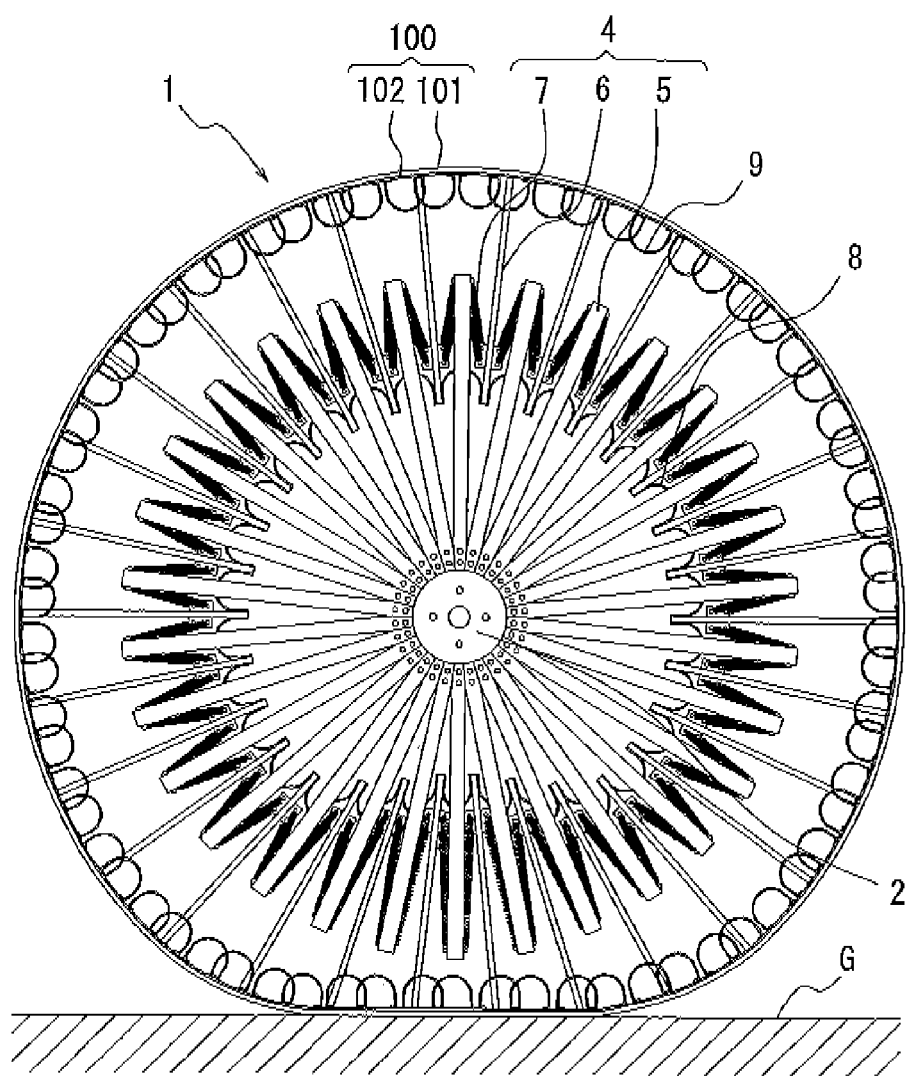
FIG. 12 is a side view showing the wheel of FIG. 9 in a grounding state.

When the wheel 1 having the grounding member 100 is mounted on the vehicle and contacts the ground G, as shown in FIG. 12, the coil springs 7 in the ground contact region are extended by the load from the vehicle, the second support member 6 are displaced radially inward. That means the first support member 5 and second support member 6 are relatively displaced significantly along the radial direction and in directions approaching each other. Thereby, the grounding member 100 in the ground contact region is deformed to correspond to the profile of ground G, the ground contact length of the grounding member 100 is enlarged, then the ground contact pressure in reduced. While since the grounding member 100 includes the porous member 101, the grounding member 100 is significantly deformed to correspond to the surface profile of ground G. Therefore, since the ground contact pressure of the grounding member 100 is uniformed and reduced, in other words, enlargement of local ground contact pressure is prevented, the sands are not collapsed or dug, a traction performance is secured. In addition, because the holes are exposed at the tread surface of the grounding member 100, the sands can be taken in the holes, thereby the fraction performance is further improved due to an edge effect.

Since the grounding member 100 in the ground contact region is imparted with a tension by the U-shaped plate springs 9 and stretched, the buckling as shown in FIG. 4, i.e., the uplift of the grounding member 100 from the ground G is prevented, whereby the grounding member 100 is constantly uniformly pressed.

Figure 13:
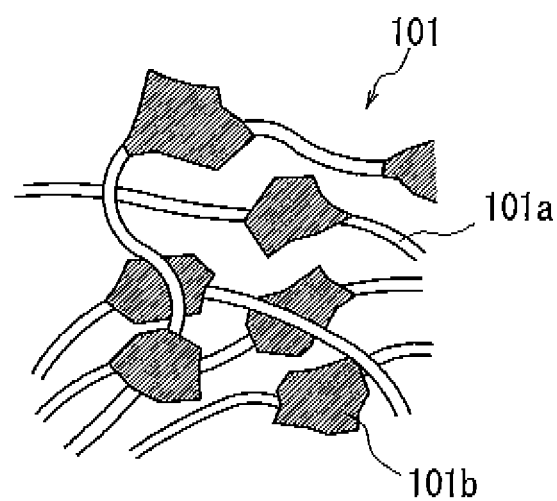
FIG. 13 is a enlarged schematic view of a porous member accordance with a preferred example of grounding member of present invention.
Figure 14:
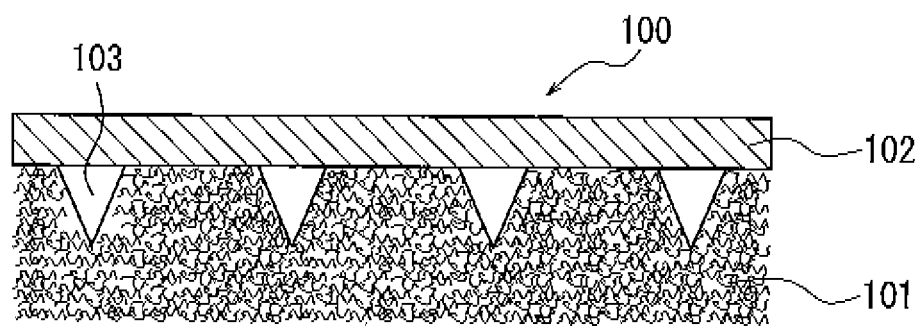
FIG. 14 is a cross sectional view of a grounding member accordance with a preferred example of present invention.
Figure 14:
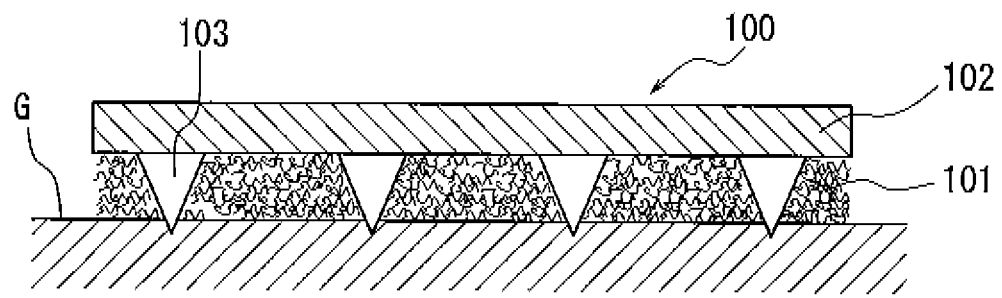

Here, preferred example of the grounding member in accordance with the present invention will be described. FIG. 13 is an enlarged schematic view showing a part of preferred grounding member of the present invention. FIG. 14 is an enlarged cross sectional view showing another preferred grounding member of the present invention, wherein (a) is showing in a pre-grounding state and (b) is showing in a grounding state. As shown in FIG. 13, porous member 101 of the grounding member 100 is formed by three-dimensionally entangling the fibers 101a together. The fibers 101 have abrasive-grain-like prominences 101b. According to the grounding member 100, during running on a sand road, the grounding member 100 including the porous members 101 can be deformed depending on the surface profile of the sand road, whereby the ground contact pressure can be uniformed and reduced. On the other hand, when the wheel runs on roads other than sand road, for instance on a rocky load, the prominence 101b acts as spike, whereby, the running stability is obtained. In addition, according to this exemplary embodiment, since the sands can be taken in the holes of the porous member 101, the fraction performance can be further improved.

The grounding member 100 shown in FIG. 14, has keen projections 103 on the surface on which the porous member 101 of the plat-like support member 102 is layered. The projections 103 are configured to project from the porous member 101 under the load when the wheel contacts the ground G. According to this, the projection 103 acts as spike when the wheel contacts the ground. It is noted that the projection 103 may be configured as self extensible projection which project from the porous member 101 at a timing of the wheel grounding. Or a compressive deformation of the projection 103 can be larger than that of the porous member 101 so that the porous member 101 is preferentially flattened out and the projections 103 project from the porous member 101.

It is preferred that a void ratio of the porous member 101 is within a range of 0.1%-50%. When the void ratio is less than 0.1%, the grounding member 100 may not sufficiently correspond to the surface profile of the ground G. When the void ratio is more than 50%, the fraction performance may not be enough. In order to improve the fraction performance by taking the sands in the holes exposed on the tread surface of the grounding member 100, it is preferred that an average hole diameter is within a range of 100%-500% of an average sand diameter of the sands covering the celestial body.

It is preferred that the thickness of the porous member 101 is within a range of 0.1 mm-10 mm. When the thickness of the porous member 101 is less than 0.1 mm, the grounding member 100 may not sufficiently correspond to the surface profile of the ground G. When the thickness of the porous member 101 is more than 10 mm, the porous member 101 may be broken or damaged during running.

In addition, in the wheel applied with the grounding member of the present invention, it is preferred that an average ground contact pressure is within a range of 1 kPa-2 kPa. When the average ground contact pressure is less than 1 kPa, the fraction performance may not be enough. When the average ground contact pressure is more than 2 kPa, the holes are closed and the grounding member may not sufficiently correspond to the surface profile of the ground G.

Figure 15:
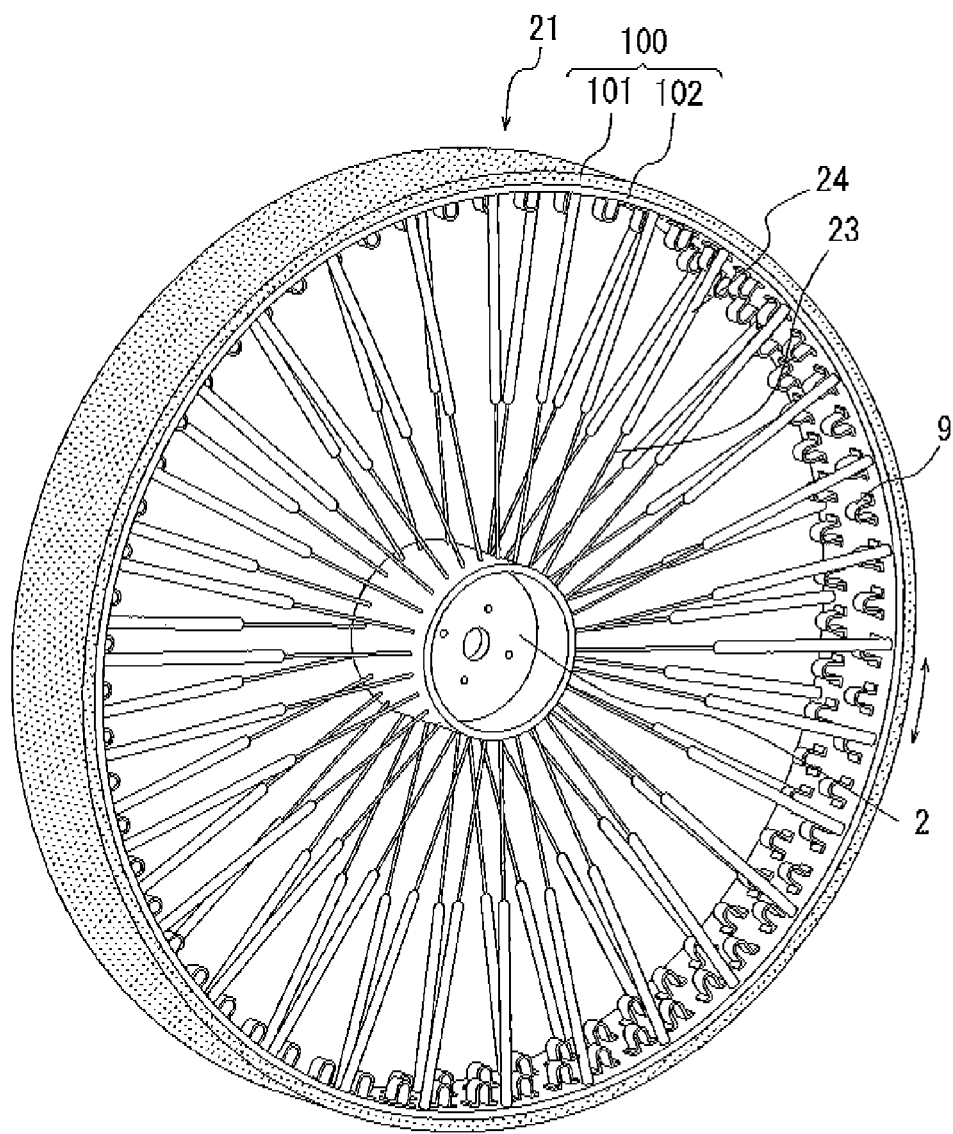
FIG. 15 is a perspective view showing another celestial body running vehicle wheel applied with the grounding member of the present invention.
Figure 16:
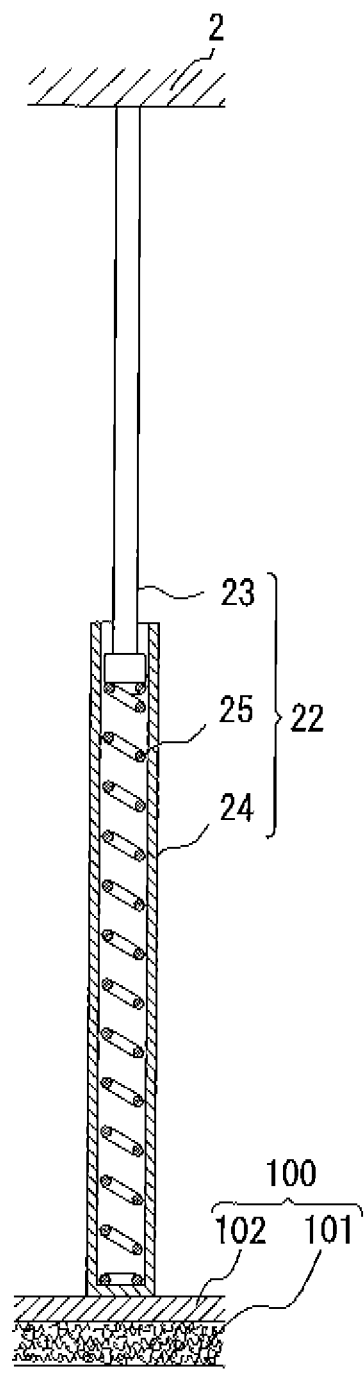
FIG. 16 (a) is a partial cross sectional view along the wheel radial direction showing the wheel of FIG. 15 in a pre-grounding state.
Figure 16:
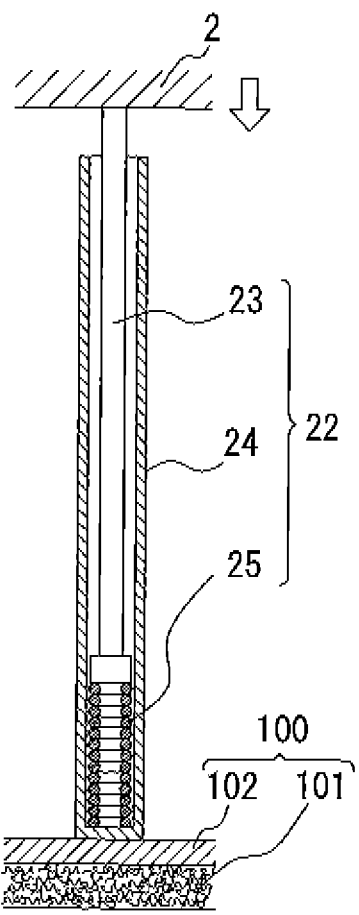

Here, another wheel applied with the grounding member 100 of the present invention is described. FIG. 15 is a schematic perspective view showing an exemplary embodiment applying the grounding member 100 to the wheel 21 which has similar configuration as the wheel of FIG. 5. FIG. 16(a) is partial sectional view along the wheel radial direction showing the wheel of FIG. 15 in a pre-grounding state. FIG. 16(a) is partial sectional view along the wheel radial direction showing the wheel of FIG. 15 in a grounding state.

Figure 17:
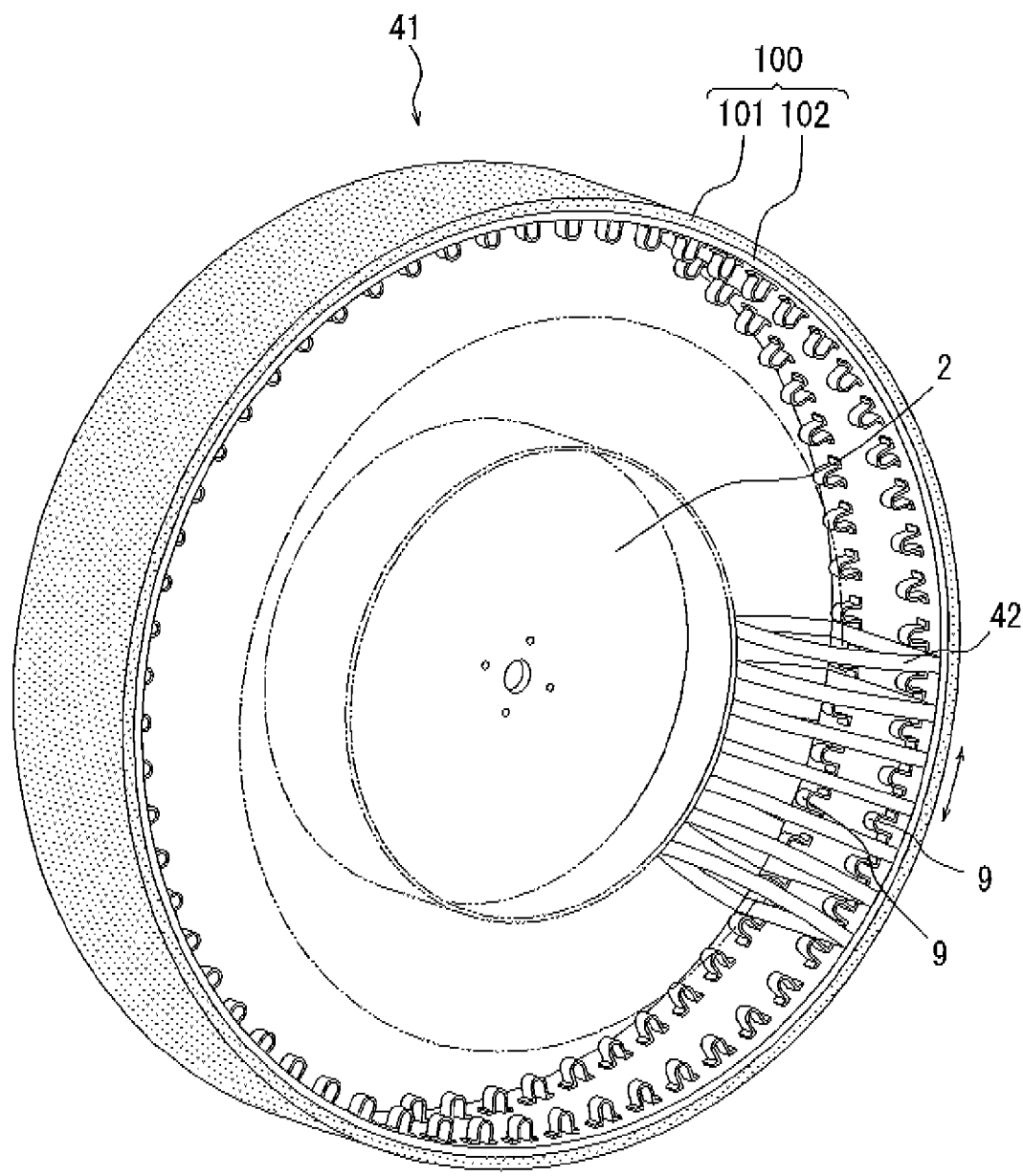
FIG. 17 is a perspective view showing another celestial body running vehicle wheel applied with the grounding member of the present invention.

FIG. 17 is a schematic perspective view of another wheel applied with the grounding member 100 of the present invention. In this drawing, the wheel 41 has disk-like shaped hub body 2, the grounding member 100 disposed radially outward of the hub body 2, thin-plate-like plate spring members 42 connecting the hub body 2 and the grounding member 100. The grounding member 100 is formed by attaching the pre-determine thickness porous member 101 to the thin-plate-like support member 102 which continuously extends in wheel circumferential direction, as same as above embodiments. The plate spring members 42 located between the hub body 2 and the grounding member 100 constitute the load bearing means which reduces the distance between the hub body 2 and the grounding member 100 as well as elastically swells outward in width direction. It is noted that, in FIG. 17, a part of the plate spring members 42 is shown by full lines while the rest of those are omitted by phantom lines, but the plate spring members 42 are arranged all around of the wheel as shown in FIG. 19.

Each plate spring member 42 extends from the first width end of the hub body 2 to outward in the wheel width direction, extends along the inner circumference surface of the grounding member 100, extends inward in wheel radial direction to the second width end of the hub body 2, and fixed to the hub body 2. The plate spring members 42 can be arranged all around of the wheel at predetermined pitch, but these should be arranged not to interfere with the elastic deformation of the plate spring members 42 due to contacts of circumferentially adjacent plate spring members 42 during running. As shown FIG. 18 (a), the plate spring members 42 are pre-curved outward in the wheel width direction so that the plate spring members 42 elastically swells outward in width direction under the load in the wheel radial direction. Therefore, the plate spring members 42 support the load in the wheel radial direction as well as connect the hub body 2 and the grounding member 100. Although in above example the pre-curved plate spring members 42 are used, it may be used with pre-bended plate spring members (not shown) which restorablely bend outward in the wheel width direction during the grounding of the wheel 41. Also, although each plate spring member 42 is formed by one continuous member, extending from the first width end of the hub body 2 to the second width end of the hub body 2 through on the inner circumferential surface of the grounding member 100, it can be formed with a pair of segmented plate spring members (not shown) which respectively extend from the first and second width ends of the hub body 2 to the inner circumferential surface of the grounding member 100. In this case, the locations of these segmented plate spring members in the wheel circumferential direction are differ from each other.

Figure 18:
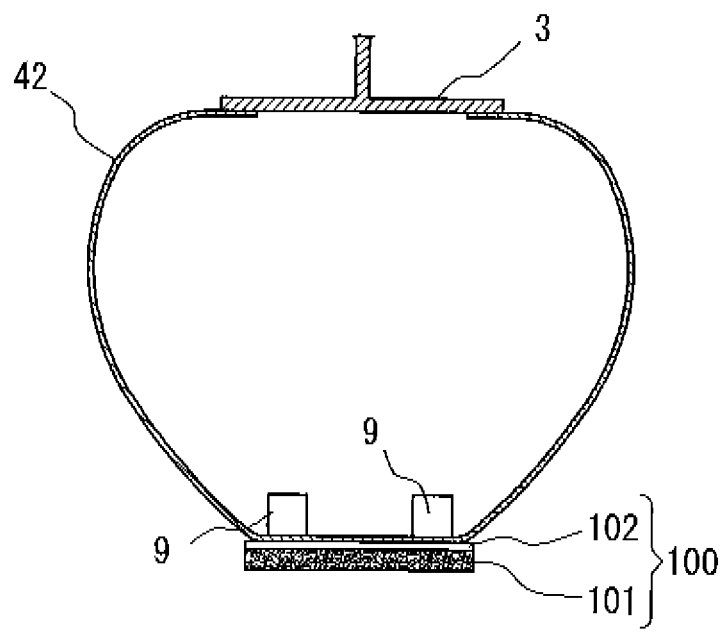
FIG. 18 (a) is a partial cross sectional view along the wheel radial direction showing the wheel of FIG. 17 in a pre-grounding state.
Figure 18:
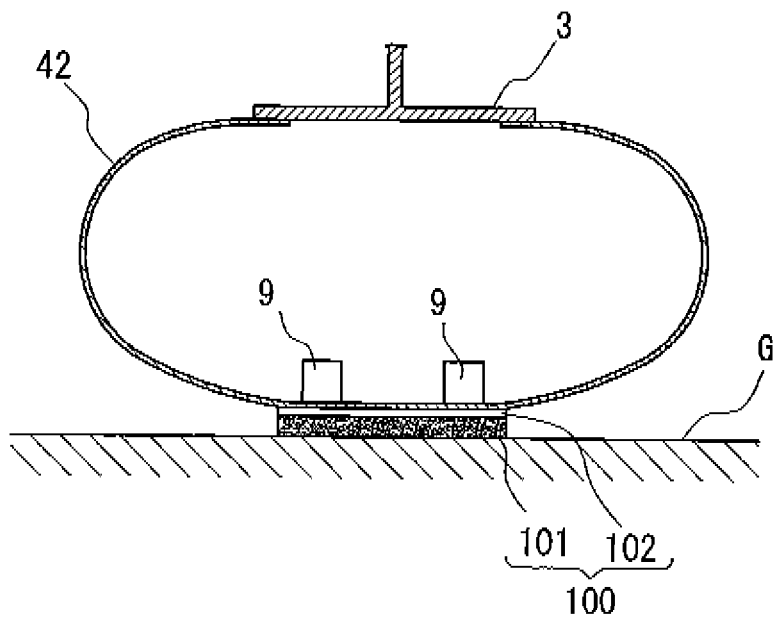
Figure 19:
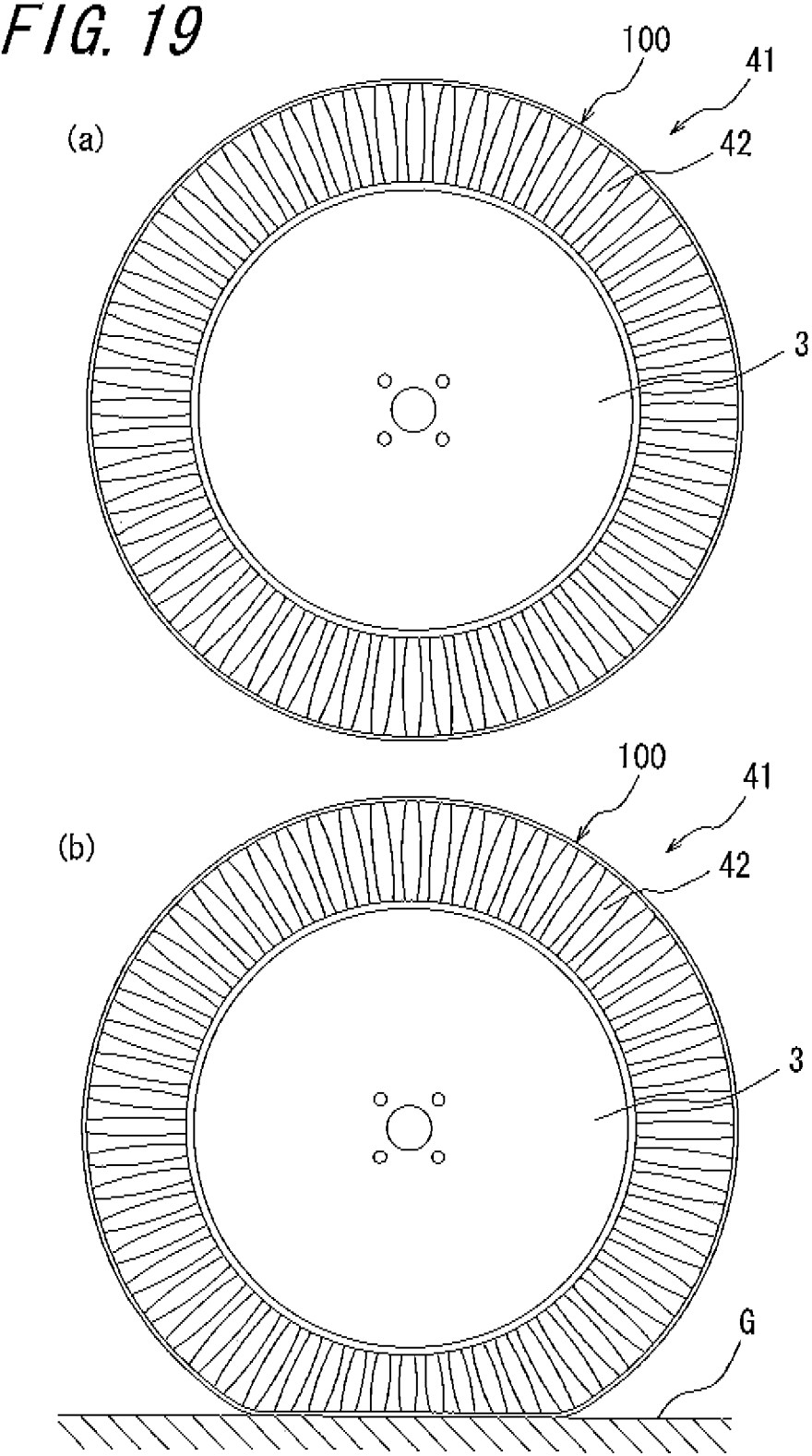
FIG. 19 (a) is a side view of the wheel of FIG. 17 in a pre-grounding state.

As shown in FIG. 18 (b) and FIG. 19 (b), when the wheel 41 is mounted on the vehicle and contacts the ground G, the plate springs 42 in the ground contact region are pushed down and bent in curving shape. FIG. 18 (b) and FIG. 19 (b) show the plate spring members 42 between the hub body 2 and the grounding member 100 before enter the ground contact region. After the plate spring members 42 enter the ground contact region, the plate spring members 42 are compressed in the wheel radial direction and bent in curving shape, whereby the plate spring members 42 significantly swelled outward in width direction. Also, since the grounding member 100 includes the porous member 101, the grounding member 100 is significantly deformed to correspond to the surface profile of the ground G during grounding. Therefore, since the ground contact pressure of the grounding member 100 is uniformed and reduced, in other words, enlargement of local ground contact pressure is prevented, the sands are not collapsed or dug, the fraction performance is secured. In addition, since the holes are exposed at the tread of the grounding member 100, the sands can be taken in the holes. Thereby, the fraction performance is further improved.

In addition, on the inner circumferential surface of the grounding member 100, two U-shaped plate springs 9 as the tension imparting means are disposed each between circumferentially adjacent plate spring member 42. Since the grounding member 100 in the ground contact region is imparted with tension by the U-shaped plate springs 9 and stretched out, the buckling as shown in FIG. 4 i.e., the uplift of the grounding member 100 from the ground G is prevented, whereby the grounding member 100 is constantly uniformly pressed. As a result, the grounding member 100 is constantly uniformly pressed on the ground G.

Figure 20:
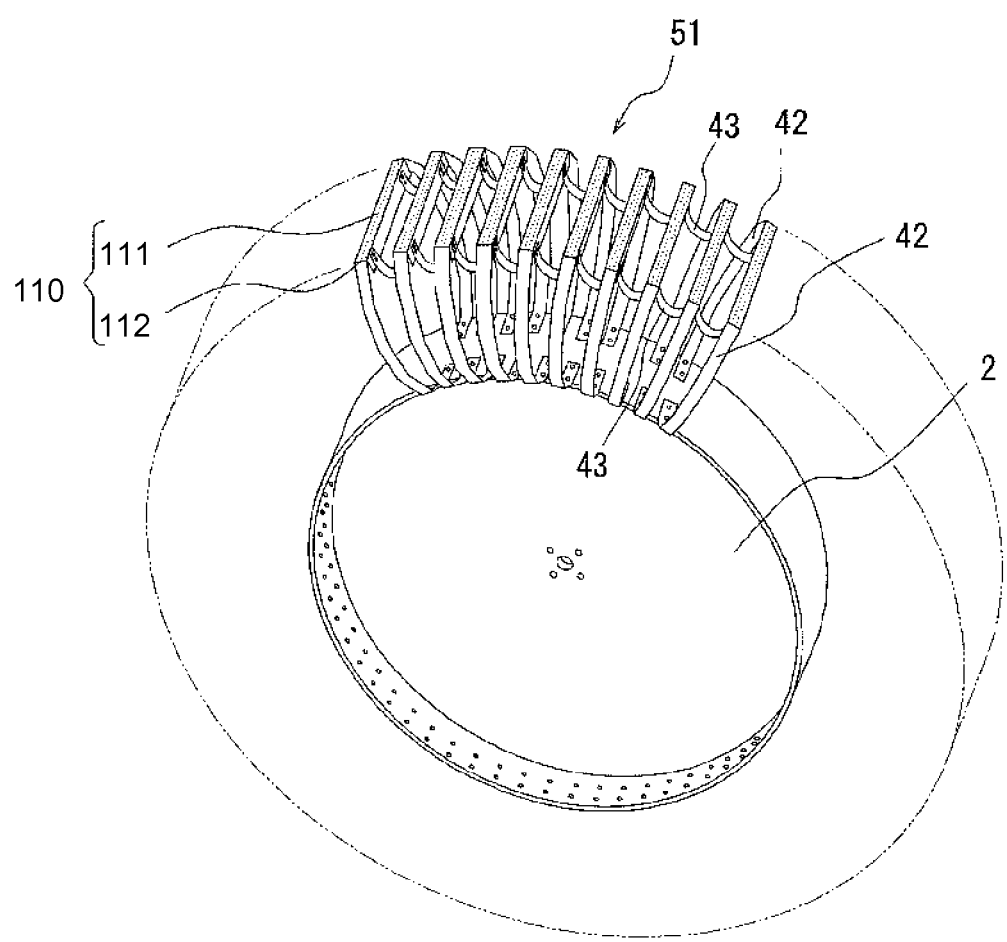
FIG. 20 is a perspective view showing another celestial body running vehicle wheel applied with the grounding member of the present invention.

FIG. 20 shows another wheel applied with the grounding member of the present invention. Wheel 51 has a disk-like hub body 2 and a grounding member 110 disposed outside of the hub body 2 in the wheel width direction. The grounding member 110 is formed by a plurality of segments, wherein each segment is configured by attaching porous member 111 on thin-plate-like support member 112 segmented in circumferential direction. It is provided with plate spring members 42 as load bearing means between the hub body 2 and the grounding member 110, which approximate the hub body 2 and the grounding member 110 with each other and are swelled outward in width direction. It is noted that, in FIG. 20, a part of the plate spring members 42 is shown by full lines while the rest of those are omitted by phantom lines, but the plate spring members 42 are arranged all around of the wheel.

The wheel 51 is provided with U-shaped plate springs 43 each between circumferentially adjacent segments. The plate segment 43 is arranged so that the convex side of the plate spring 9 faces to the inner radial direction and the opening side of the plate spring 9 faces to the hub body 2. The plate segment 43 imparts bias force (i.e., force for separating the circumferentially adjacent segments) in the direction shown as arrow in FIG. 20 to the circumferentially adjacent segments 110. According to this, since the U-shaped plate springs 43 can impart the tension to the whole grounding member 110, an excessive approximation and contact among the segments are inhibited. As a result, the buckling as shown FIG. 4 on the grounding member 110 can be prevented. In addition, the plate springs 43 couple the adjacent segments each other and maintain the shape of the wheel. Thus, the plate springs 43 mentioned here constitute the tension imparting means for imparting the tension to the grounding member, as well as the biasing means for biasing the circumferentially adjacent load bearing means and separating each other in the circumferential direction.

It is preferred that, the proportion of ground contact length to the wheel contour length is 10% or more at the wheel running under the load. According to this, since the buckling is prevented by the tension imparting means and sufficient ground contact length is secured, the wheel can exhibit its fraction performance for sure.

Above-mentioned embodiments are just a part of the present invention, and the embodiments may take on various modifications and alterations without departing from the spirit and scope of the disclosure. For example, the porous member of the grounding member not limited to the above embodiment as long as it can be deformed to corresponding to the surface profile of the sand road, and allow the ground contact pressure to be uniformed and reduced. It is preferred that the grounding member has holes on the tread surface for taking the sands in.

According to the present invention, the celestial running vehicle wheel enables the celestial running vehicle to sufficiently exhibit its desired running performance.

The invention claimed is:

1. A celestial body vehicle wheel to be mounted on a celestial body running vehicle designed for running on a celestial body comprising:
   a hub body rotatable about a rotation axis;
   a grounding member arranged radially outside of the hub body and rotatable about the rotation axis while contacting a celestial body surface; and
   a load bearing means arranged between the hub body and the grounding member for bearing radial load, the load bearing means including:
      a plurality of first support members arranged circumferentially to extend radially outward from the hub body and terminate short of the grounding member;
      a plurality of second support members arranged circumferentially to extend radially inward from the grounding member and terminate short of the hub body; and
      elastic members for connecting the first support members and the second support members to each other,
      wherein the first support member and the second support member are in different positions in the circumferential direction of the wheel and each second support member is linked to two pairs of first support members adjacent to the each second support member, and
   wherein, under the radial load, the elastic members are elastically deformed, and the first support members and the second support members are relatively displaced in directions approaching each other.

2. The celestial body vehicle wheel according to claim 1, wherein said load bearing means is located inside of ends of said grounding member in a width direction thereof.

3. The celestial body vehicle wheel according to claim 1, further comprising biasing means for biasing the circumferentially adjacent second support members and separating each other in a circumferential direction.

4. The celestial body vehicle wheel according to claim 3, wherein each of said biasing means is a U-shaped plate spring.

5. The celestial body vehicle wheel according to claim 1, wherein said grounding member is an endless belt.

6. The celestial body vehicle wheel according to claim 5, further comprising tension imparting means for imparting a tensile force in a circumferential direction to said endless belt.

7. The celestial body vehicle wheel according to claim 1, wherein said grounding member has stepped portions extending in a width direction on a surface which contacts the celestial body surface.

8. The celestial body vehicle wheel according to claim 1, wherein said grounding member has metal fibers on a surface which contacts the celestial body surface.

* * * * *